US010902363B2

(12) United States Patent
Narayanam et al.

(10) Patent No.: US 10,902,363 B2
(45) Date of Patent: Jan. 26, 2021

(54) DETERMINING AN ORDER OF EMPHASIS FOR CAPACITY PLANNING METRICS BASED ON SIMILARITY SCORES OF STAKEHOLDER PREFERRED ORDERS OF EMPHASIS WHILE PROTECTING STAKEHOLDER PRIVACY

(71) Applicant: International Business Machines Corporation, Armonk, NY (US)

(72) Inventors: Ramasuri Narayanam, Bangalore (IN); Gyana Ranjan Parija, New Delhi (IN); Shrihari Vasudevan, Bangalore (IN); Ritwik Chaudhuri, Bangalore (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/117,875

(22) Filed: Aug. 30, 2018

(65) Prior Publication Data
US 2020/0074366 A1 Mar. 5, 2020

(51) Int. Cl.
*G06Q 10/06* (2012.01)

(52) U.S. Cl.
CPC . *G06Q 10/06313* (2013.01); *G06Q 10/06393* (2013.01)

(58) Field of Classification Search
CPC ........... G06Q 10/06313; G06Q 10/101; G06Q 10/0639; G06Q 10/06316; G06Q 10/063
See application file for complete search history.

(56) References Cited

U.S. PATENT DOCUMENTS 5,844,817 A * 12/1998 Lobley ................... G06Q 99/00
703/2
6,151,565 A * 11/2000 Lobley ................... G06Q 10/06
703/2

(Continued)

OTHER PUBLICATIONS

Yehong, Li et al., Indentifying stakeholders and key performance indicators for district and building energy performance analysis Energy and Buildings, vol. 155, 2017 (Year: 2017).*

(Continued)

*Primary Examiner* — Scott L Jarrett
(74) *Attorney, Agent, or Firm* — Ryan, Mason & Lewis, LLP

(57) ABSTRACT

Methods, systems, and computer program products for generating capacity planning schedules while protecting the privacy of stakeholder preferences of a set of metrics are provided herein. A computer-implemented method includes identifying stakeholders associated with capacity planning for a project; determining metrics to be used in the capacity planning; obtaining, from each of the stakeholders, an initial preferred order of emphasis of the metrics; calculating similarity scores between the initial preferred orders of emphasis; outputting, to each of the stakeholders, the similarity scores, wherein the identity of the stakeholders has been masked; obtaining, from each of the stakeholders, at least a second iteration of a preferred order of emphasis of the metrics; generating a final order of emphasis of the multiple metrics upon a determination that the stakeholders provided at least a predetermined number of identical preferred orders of emphasis; and outputting the final order of emphasis of the metrics.

18 Claims, 7 Drawing Sheets

(56) References Cited

U.S. PATENT DOCUMENTS

| | | | |
|---|---|---|---|
| 6,850,891 B1* | 2/2005 | Forman | G06Q 10/063 |
| | | | 705/7.11 |
| 8,515,884 B2 | 8/2013 | Doctor et al. | |
| 8,856,332 B2* | 10/2014 | Johnson | G06F 15/173 |
| | | | 709/226 |
| 9,292,832 B2 | 3/2016 | Goel et al. | |
| 10,366,361 B1* | 7/2019 | Sammarco | G06Q 10/0639 |
| 2002/0049621 A1* | 4/2002 | Bruce | G06Q 10/06 |
| | | | 705/7.26 |
| 2002/0103695 A1* | 8/2002 | Urken | G06Q 30/02 |
| | | | 705/12 |
| 2007/0179829 A1 | 8/2007 | Laperi et al. | |
| 2009/0198613 A1 | 8/2009 | Reeves et al. | |
| 2010/0153142 A1 | 6/2010 | Vasudevan et al. | |
| 2011/0258015 A1 | 10/2011 | Garrigan et al. | |
| 2013/0198207 A1* | 8/2013 | Dolan | G06Q 50/22 |
| | | | 707/749 |
| 2015/0134386 A1 | 5/2015 | Jogalekar et al. | |
| 2015/0213388 A1* | 7/2015 | Munakata | G06Q 10/06316 |
| | | | 705/7.26 |
| 2016/0140789 A1* | 5/2016 | Wickersham, III | H04W 4/021 |
| | | | 705/12 |
| 2017/0316326 A1* | 11/2017 | Ricketts | G06Q 10/00 |
| 2018/0018409 A1 | 1/2018 | Peters | |
| 2019/0188582 A1* | 6/2019 | Kephart | G06N 5/045 |
| 2019/0272490 A1* | 9/2019 | Stewart | G06F 16/2282 |

OTHER PUBLICATIONS

Chorfi, Zoubida et al., Selection of Key Performance Indicators for Supply Chain Monitoring using MCDA IEEE, 2015 (Year: 2015).*

Jiang, Y., Prioritizing and selecting KPIs: Translate performance results into managerial actions in strategy making process. System Engineering, Policy Analysis and Management, 2014 (Year: 2014).*

Shahin, Arash et al., Prioritization of key performance indicators: An integration of analytical hierarchy process and goal setting Emerald Insight, Nov. 2006 (Year: 2006).*

Kibira, Deogratias et al., Procedure for Selecting Key Performance Indicators for Sustainable Manufacturing ASME Journal of Manufacturing Science and Engineering, vol. 140, No. 1, Jan. 2018 (Year: 2018).*

Turing test definition Wikipedia.org, Retrieved Jul. 6, 2020 (Year: 2020).*

Turing Machines Stanford Encyclopedia of Philosophy, Sep. 24, 2018 (Year: 2018).*

* cited by examiner

DETERMINING AN ORDER OF EMPHASIS FOR CAPACITY PLANNING METRICS BASED ON SIMILARITY SCORES OF STAKEHOLDER PREFERRED ORDERS OF EMPHASIS WHILE PROTECTING STAKEHOLDER PRIVACY

FIELD

The present application generally relates to information technology, and, more particularly, to capacity planning techniques.

BACKGROUND

Commonly, delivery and/or execution of a project requires capacity planning, which determines an allocation of specific amounts of specific resources at specific locations and/or at specific times. However, in many instances, there are multiple stakeholders involved in the capacity planning exercise, and each such stakeholder can potentially wish to emphasize and/or favor particular metrics over other metrics, and such stakeholders might also have individual constraints of which other stakeholders are aware.

Accordingly, challenges can exist in capacity planning in situations wherein the preference ordering of certain metrics is different from one stakeholder to another stakeholder. Additionally, attempts to harmonize such differences among stakeholders face challenges in situations wherein stakeholders do not wish to reveal their private preferences of metrics to other stakeholders.

SUMMARY

In one embodiment of the present invention, techniques for generating capacity planning schedules while protecting the privacy of stakeholder preferences of a set of metrics are provided. An exemplary computer-implemented method can include identifying multiple stakeholders associated with capacity planning for one or more projects, wherein the capacity planning determines allocation of one or more resources at one or more locations during at least one portion of execution of the one or more projects. Such a method can also include determining multiple metrics to be used in connection with the capacity planning for the one or more projects, obtaining, from each of the multiple stakeholders, an initial preferred order of emphasis of the multiple metrics, and masking stakeholder identity for the initial preferred orders of emphasis of the multiple metrics. Additionally, such a method can include calculating, for each of the initial preferred orders of emphasis of the multiple metrics, similarity scores between (i) the initial preferred order of emphasis and (ii) one or more of the other initial preferred orders of emphasis. Further, such a method includes outputting, to each of the multiple stakeholders, the similarity scores between (i) the initial preferred order of emphasis attributed to the stakeholder and (ii) the one or more other initial preferred orders of emphasis attributed to one or more of the other stakeholders, wherein the identity of the stakeholders has been masked, and obtaining, from each of the multiple stakeholders, at least a second iteration of a preferred order of emphasis of the multiple metrics. Also, such a method includes generating a final order of emphasis of the multiple metrics upon a determination that the obtained at least second iteration of preferred orders of emphasis includes at least a predetermined number of identical preferred orders of emphasis, representing the final order of emphasis, and outputting the final order of emphasis of the multiple metrics to at least one of (i) a user and (ii) a model for generation of a capacity planning schedule for the one or more projects.

In another embodiment of the invention, an exemplary computer-implemented method can include steps of generating a capacity planning schedule for the one or more projects based at least in part on the final order of emphasis of the multiple metrics, and outputting the capacity planning schedule to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
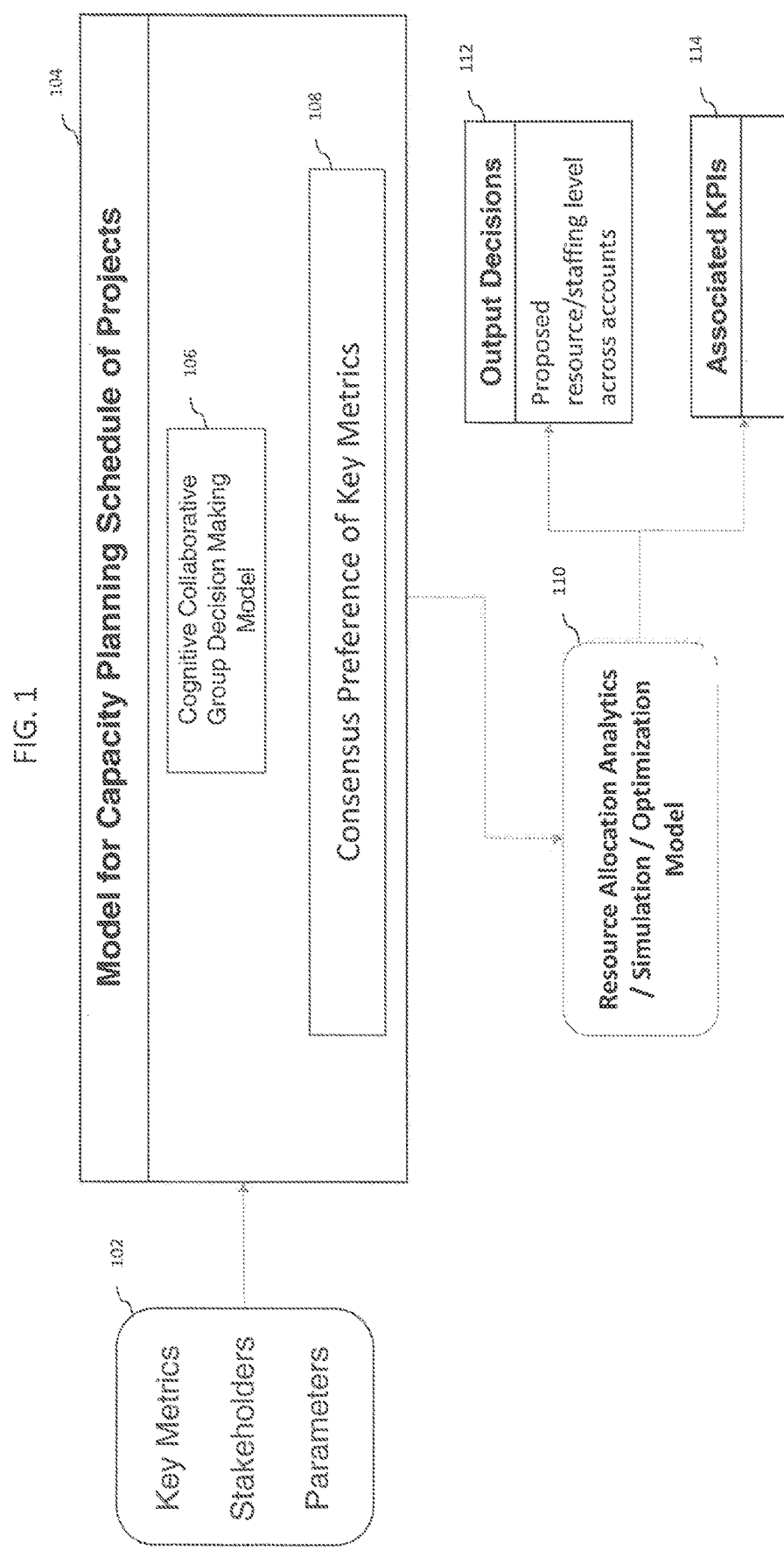
FIG. 1 is a diagram illustrating system architecture, according to an exemplary embodiment of the invention.

As described herein, an embodiment of the present invention includes an oracle-based collaborative cognitive decision-making system to protect the privacy of stakeholders' private preferences over key metrics in connection with generating capacity planning schedules for one or more projects. As used herein, an "oracle" refers to an abstract machine used to study decision problems. By way of example, an oracle can be visualized as a Turing machine with a black box, which is able to solve certain decision problems in a single operation.

As noted herein, consider an example scenario wherein there are several stakeholders involved in a capacity planning exercise. Such stakeholders might include, for example, a project lead, a manager, a finance officer, a legal officer, a senior manager, a chief experience officer (CXO), etc. Consider also that each of these stakeholders potentially has one or more particular metrics that he or she wishes to focus on and/or emphasis in the execution of the capacity planning. Metrics used in the context of capacity planning can include, for example, customer satisfaction metrics, metrics pertaining to service level agreements (SLAs), profit maximization metrics, revenue-related metrics, metrics pertaining to co-location fraction of employees with relevant skills, metrics pertaining to labor and logistics cost, etc. Additionally, within the overarching enterprise or organization connecting the stakeholders, there might be common goals such as clients' best interests, SLA compliance, etc., that are to be served and/or prioritized by any capacity planning exercise.

Accordingly, at least one embodiment of the invention includes a decentralized approach for generating a single preference ordering of a set of metrics across multiple stakeholders such that (i) the single preference ordering represents a consensus outcome among all stakeholders, or (ii) the single preference ordering represents a consensus outcome among at least a given/pre-determined percentage of stakeholders. Additionally, one or more embodiments of the invention include generating capacity planning schedules for one or more projects using the determined and/or generated metric preference ordering within a collaborative cognitive group decision-making framework.

As further detailed herein, such an embodiment includes protecting the privacy of stakeholders' private preferences over the set of metrics. In one or more embodiments of the invention, the privacy of stakeholder preferences can be protected via implementation of an oracle, to which the stakeholders send a sequence of queries for computation of the similarities between such preferences and other stakeholder's preferences. For example, consider the following illustrative scenario: (a) stakeholder1 sends a query to the oracle inquiring whether the similarity between his own preference and that of stakeholder2 is 8; (b) the oracle responds with a "yes" or "no" answer; (c) if the answer is "yes," then stakeholder 1 comes to know about the desired similarity score of his own preferences and that of stakeholder2 without actually knowing stakeholder2's preferences; and (d) if the answer is "no," then stakeholder 1 sends a different query to the oracle by varying the similarity score.

In one or more embodiments of the invention, the determined and/or generated single metric preference ordering can be provided as input to an optimization model, which uses such input to generate a capacity planning schedule for the execution of one or more projects. Such an embodiment includes enabling and/or allowing stakeholders to interact over multiple iterations metric preference ordering inputs, including one or more revisions submitted by a stakeholder at least in part due to similarity scores generated between the stakeholder's preference ordering and orderings of one or more of the other stakeholders involved in the capacity planning exercise.

Accordingly, as additionally described herein, at least one embodiment of the invention includes determining one or more revised metric preference orderings for each stakeholder by utilizing the current (that is, of the instant iteration) stakeholder metric preference orderings and similarity scores generated across the current stakeholder metric preference orderings. Because the preferences are rank orders (of metrics), in one or more embodiments of the invention, the similarity scores can be calculated using the Kendall Tau distance measure. For instance, consider two rank orders: (i) a, d, c, b, and (ii) d, a, b, c. Now, following the Kendal Tau distance measure, the similarity between these two preference orders is defined as the number of pairs with agreement in both these preference orders. This example refers to a pair of symbols as being in agreement in both of the preference orders if the symbols appear in the same order. Following these definitions, the set of pairs of symbols in the same order in both preferences={(a,c), (a,b), (d,c), (d,b)}. Accordingly, the similarity between the above two preferences is 4.

One or more embodiments of the invention, as such, include implementing an iterative approach wherein each stakeholder can progressively revise his or her preference over the set of metrics (if a consensus has not yet been reached across all stakeholders). The stakeholders are enabled to interact among themselves in repeated fashion to make a collaborative decision in the ultimate form of a single preference ordering of key metrics. In each iteration of stakeholder communication, each stakeholder is able to revise his or her preference ordering. Such a revision can be based, for example, on similarity scores, generated by such an embodiment of the invention, comparing that stakeholder's preference ordering to that of one or more of the other stakeholders. After a consensus preference of the key metrics is obtained among at least a certain percentage of the stakeholders, this consensus preference can be utilized as input by a margin optimization model to determine the capacity planning schedule for one or more projects, as well as values for one or more key performance indicators (KPIs). KPIs that can be utilized in the context of capacity planning in one or more embodiments of the invention include maximizing customer satisfaction, SLA impact, maximizing profit, maximizing revenue, co-location fraction of employees with relevant skills, labor and logistics costs, etc.

As detailed herein, based at least in part on the content of the individual and client-centric metrics involved in a particular capacity planning exercise, each stakeholder may have his or her own personal estimation of the capacity planning which he or she does not wish to reveal explicitly (to other stakeholders). Accordingly, at least one embodiment of the invention includes masking stakeholder identity in conjunction with communications that include metric preference orderings, which maintains the privacy of the stakeholders' relevant opinions.

FIG. 1 is a diagram illustrating system architecture, according to an embodiment of the invention. By way of illustration, FIG. 1 depicts inputs 102 including key metrics, stakeholder identities/identifiers, and one or more parameters. Example parameters can include the number of stakeholders, the number of KPIs, the number of rounds in the optimization model, the error threshold to define consensus among stakeholders, etc. Such inputs 102 are provided to a model 104 for capacity planning schedules of projects, wherein model 104 includes a cognitive collaborative group decision-making model 106. The cognitive collaborative group decision-making model 106 utilizes inputs 102, as well as one or more rounds/iteration of stakeholder communication pertaining to stakeholder metric preference orderings, to generate a consensus metric preference ordering of key metrics 108.

As used herein, one or more embodiments of the invention can utilize one or more characterizations of a "consensus" metric preference ordering. A first type of consensus metric preference ordering represents a consensus (that is, agreement) among all stakeholders with respect to the metric ordering. A second type of consensus metric preference ordering represents a consensus among a given and/or predetermined percentage of the stakeholders with respect to the metric ordering.

Referring again to FIG. 1, model 104 outputs the consensus preference of key metrics 108 to an optimization model 110 (which can pertain to resource allocation analytics, simulation, etc.), which uses the consensus preference of key metrics 108 to generate one or more output decisions 112 (such as, for example, a proposed level of resources and/or staffing across one or more accounts) and one or more associated KPIs 114.

In at least one embodiment of the invention, a model for margin optimization can include the set of stakeholders (such as project leads, managers, finance officers, legal officers, CXOs, etc.), as well as a list of possible preference profiles over the set of key metrics (assuming that there can be m feasible capacity planning solutions). Possible preference profiles, as used herein, refer to the set of preferences as specified by the stakeholders. Additionally, utilizing such a model, each stakeholder has a private utility component and a public utility component, and each stakeholder has his or her own personal capacity planning schedule.

By way merely of illustration, let $\{p_1, p_2, \ldots, p_n\}$ be the set of personal preferences of the stakeholders, which are also referred to herein as ground-truth preferences of the stakeholders. The stakeholder's private utility component is at a maximum value if his or her preference is the consensus outcome; otherwise, the private utility component of the stakeholder is represented by a smaller value. The public utility component of each stakeholder is at a maximum value when all of the stakeholders reach a consensus; otherwise, this component is represented by a smaller value.

As also detailed herein, one or more embodiments of the invention include implementing a structure of repeated iterations of interaction among the stakeholders. By way of illustration, consider the following example use case: In Round 1, each stakeholder announces his or her ground-truth preference as the strategy. Then, each stakeholder computes his or her private utility component and public utility component. In one or more embodiments of the invention, either the stakeholders or the stakeholder's representative intelligent software agent(s) can perform these computations by making use of the system(s) and techniques detailed herein. If all stakeholders report the same preference as the strategy, then a consensus is reached and the communications are ended. Otherwise, the communications proceed for one or more additional rounds, wherein strategy revisions can be made and submitted by the stakeholders until a consensus is reached.

At least one embodiment of the invention includes using the following utility function:

$$U_i(s_1, s_2, \ldots, s_n) = \left\{\binom{m}{2} - d(s_i, p_i)\right\} + \left\{\sum_{j,k \in N} sim(s_j, s_k)\right\},$$

wherein the function $d(.,.)$ measures the distance (that is, dissimilarity) between two strategies (that is, metric ordering preferences), and the function $Sim(.,.)$ measures the similarity between two strategies. Additionally, the first part of the above utility function defines the notion of the private utility component, and the second part of the function defines the notion of the perceived utility component. Further, in the above function, $U_i$ is the utility of stakeholder i, $p_i$ is the initial preference order of stakeholder i, $(s_1, s_2, \ldots, s_n)$ represents the current preference orders of stakeholders $1, 2, \ldots, n$, respectively, m is the number KPIs, and N is the set of stakeholders.

Additionally, one or more embodiments of the invention can include implementing one or more strategy update rules into a model. A first such update rule can be described as follows. Consider any arbitrary round r of stakeholder communication, and stakeholder i. With a probability value of 0.5, stakeholder i continues to submit a strategy $s_i$ even in round (i+1). The purpose and/or function of this probability value is that it allows stakeholder i to continue to use the same preference order even in the next round with probability 0.5. And with the remaining probability 0.5, stakeholder i can revise his or her current preference order with a different order. Accordingly, with probability value of 0.5, stakeholder i can carry out the following: Stakeholder i computes the similarity of $s_i$ and $s_j$, wherein j is another of the stakeholders. Then, stakeholder i determines the set P of strategies having the highest similarity with $s_i$. Because, in one or more embodiments of the invention, similarities are integer numbers, stakeholder i can perform a pairwise comparison of these integer similarity scores to determine the set of strategies having a higher similarity score with $s_i$. Further, stakeholder i selects a strategy s from P that yields the highest utility (using the utility function detailed above), and subsequently submits strategy (preference ordering) s in round (i +1).

A second such update rule can be described as follows. Consider any arbitrary round r of stakeholder communication, and stakeholder i. With a probability value of 0.5, stakeholder i continues to submit a strategy $s_i$ even in round (i+1). Accordingly, with probability value of 0.5, stakeholder i can carry out the following: Stakeholder i determines the set Q of all strategies yielding more utility to the other stakeholders than $U_i$. Because, in one or more embodiments of the invention, the utilities are integer numbers, stakeholder i can perform a pairwise comparison of these integer utility scores to determine the set of strategies having a higher utility score than $U_i$. Then, stakeholder i selects a strategy s from Q that has the highest similarity with $s_i$, and subsequently submits strategy (preference ordering) s in round (i+1).

As also detailed herein, one or more embodiments of the invention includes generating and/or implementing a preference-based consensus formation model. By way of example, the process of consensus formation can occur over multiple iterations of stakeholder communication. Initially, each stakeholder has his or her own ground-truth preference over the set of possible alternatives/solutions. In each subsequent iteration, each stakeholder communicates his or her own metric preference ordering via an oracle component. In this oracle-based consensus formation model, stakeholder identities are masked, and as such, no stakeholder knows about the ground-truth preference of any other stakeholder.

Additionally, using such an oracle-based model, computing utility values in each iteration of stakeholder communication can include the following. Each stakeholder sends exactly (N−1) queries to the oracle component in order to ascertain and/or determine5 the similarity between his/her own preference and other stakeholder's preferences. Additionally, knowing these similarity scores, each stakeholder can then compute his or her utility function, which can influence his or her subsequent strategy decision.

Figure 2:
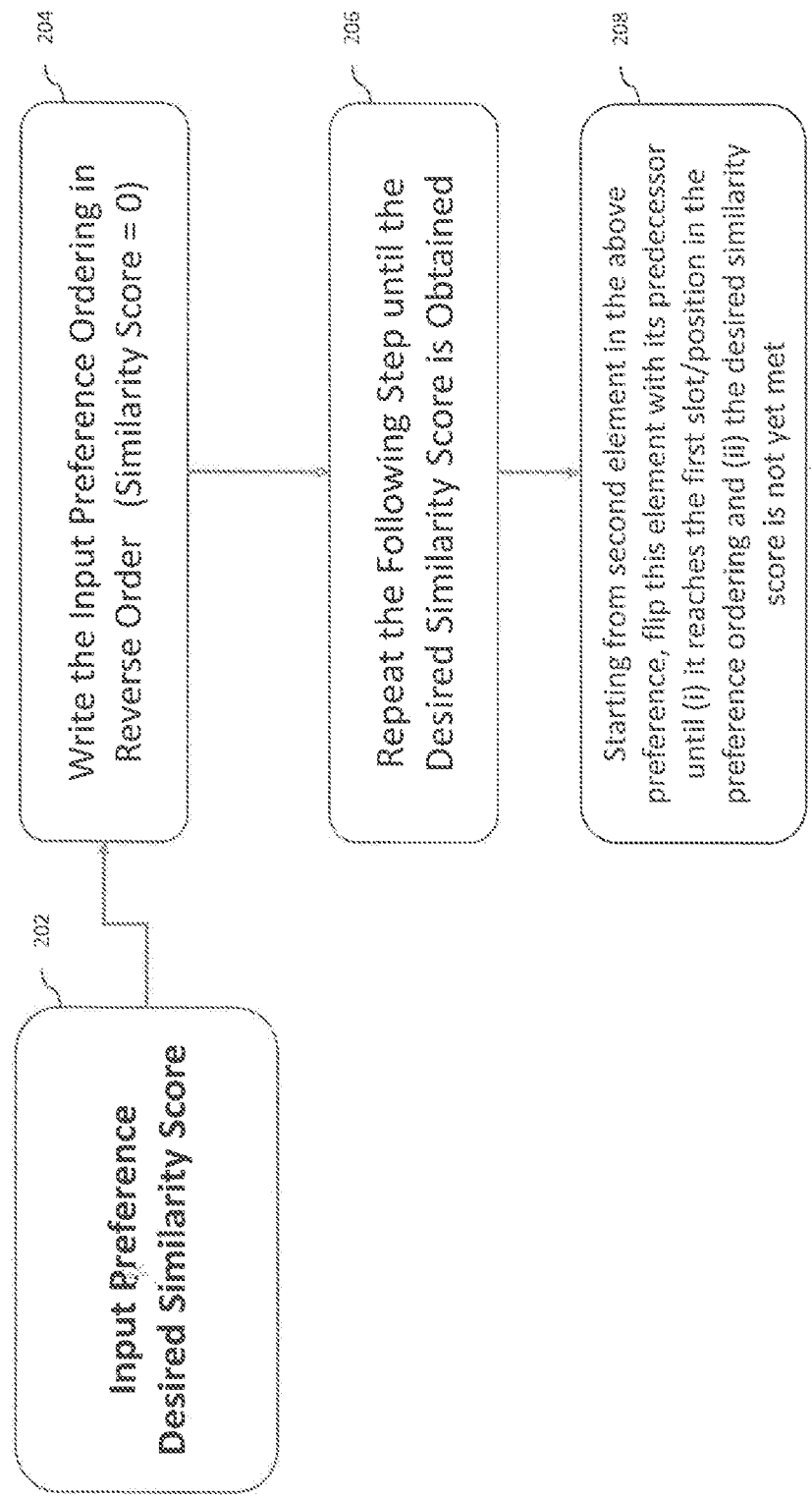
FIG. 2 is a diagram illustrating an algorithm for determining revised preferences, according to an exemplary embodiment of the invention.

FIG. 2 is a diagram illustrating an algorithm for determining revised preferences, according to an exemplary embodiment of the invention. By way of illustration, FIG. 2 depicts a set of inputs 202, which include an input preference and a desired similarity score. In one or more embodiments of the invention, a stakeholder can come to know about the desired similarity score after computing his or her utility function. In that process, the stakeholder comes to know how similar his or her current preference order is with respect to the preference orders of other stakeholders. By making use of these similarity scores and the strategy update rule (as described herein), the stakeholder calculates how much he or she should adjust his or her current preference order to align with the other preference orders of the stakeholders.

Referring again to FIG. 2, inputs 202 are utilized in step 204, which includes writing the input metric preference ordering in reverse order (and which corresponds to a similarity score of 0). Step 206 includes implementing an instruction to repeat step 208 until the desired similarity score is obtained. Step 208 includes, beginning from the second element in the input preference ordering, swapping and/or flipping this element with its predecessor until (i) the element reaches the first slot/position in the preference ordering, and (ii) the desired similarity score is not yet met.

Figure 3:
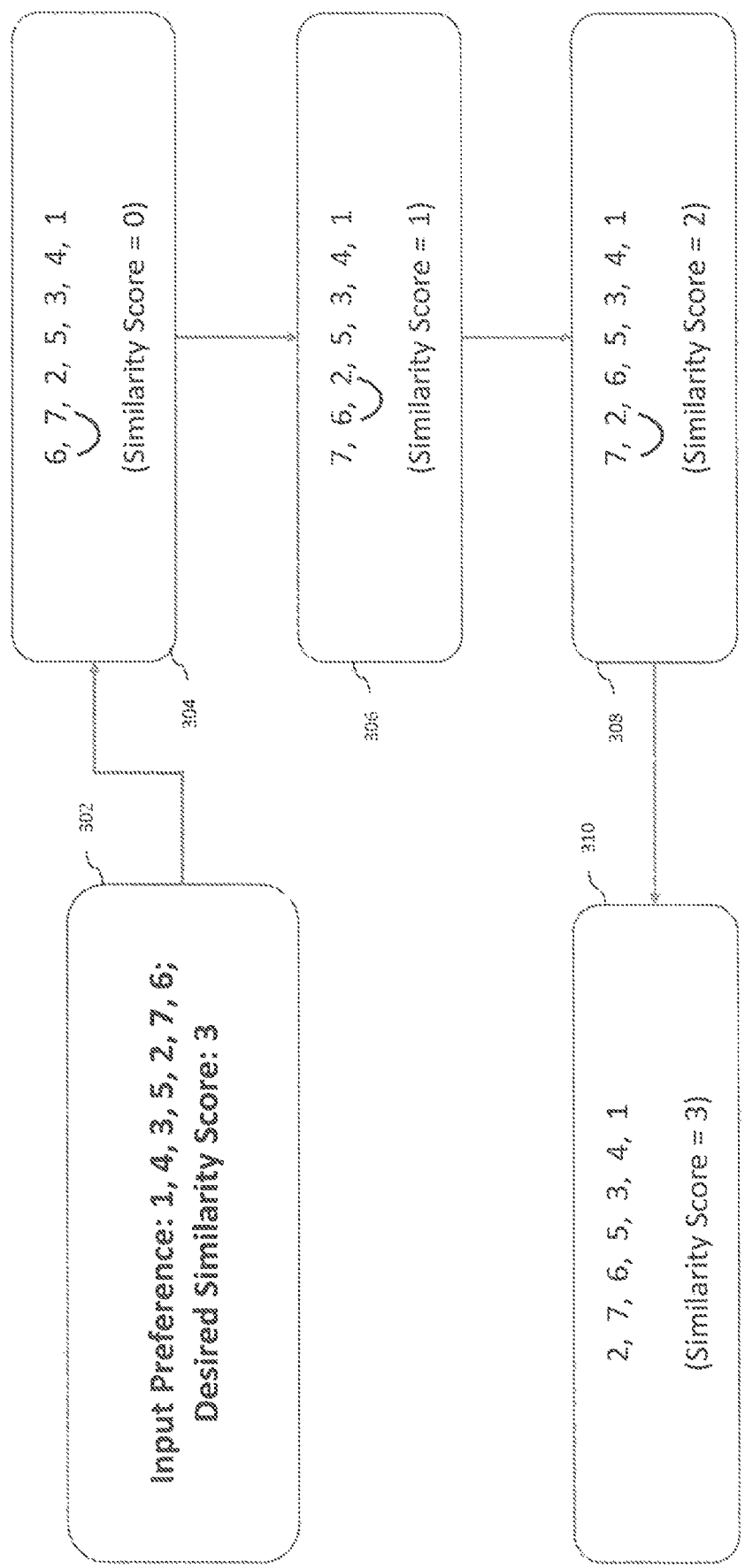
FIG. 3 is a diagram illustrating an example use case of the algorithm depicted in FIG. 2, according to an exemplary embodiment of the invention.

FIG. 3 is a diagram illustrating an example use case of the algorithm depicted in FIG. 2, according to an exemplary embodiment of the invention. By way of illustration, FIG. 3 depicts input 302, which includes an input preference of metrics 1, 4, 3, 5, 2, 7, and 6, as well as a desired similarity score of 3. In step 304, input 302 is converted to a preference ordering of 6, 7, 2, 5, 3, 4, and 1, with a similarity score of 0. Step 306 further modifies the preference ordering to 7, 6, 2, 5, 3, 4, and 1, with a similarity score of 1. Step 308 further modifies the preference ordering to 7, 2, 6, 5, 3, 4, and 1, with a similarity score of 2. Further, step 310 further modifies the preference ordering to 2, 7, 6, 5, 3, 4, and 1, with a similarity score of 3. As detailed above, in one or more embodiments of the invention, similarity scores can be calculated using the Kendall Tau distance measure.

It is to be appreciated that the techniques detailed in connection with FIG. 2 and FIG. 3 represent only one way of deriving an updated strategy (metric preference ordering). Depending upon factors such as the computational requirements, the number of rounds it takes to converge, etc., one or more alternate methods can be utilized to derive n updated strategy/preference in connection with one or more embodiments of the invention.

Figure 4:
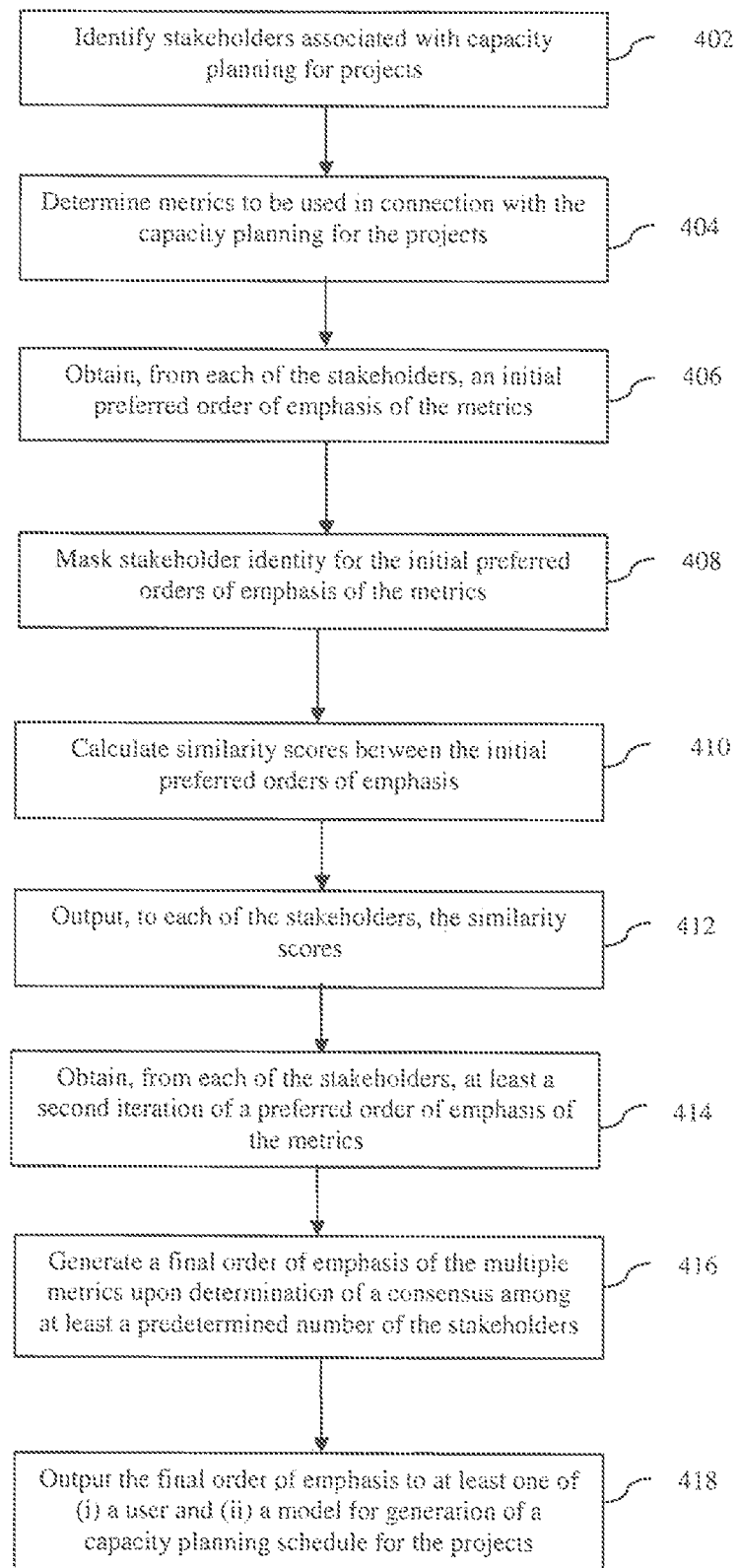
FIG. 4 is a flow diagram illustrating techniques according to an embodiment of the invention.

FIG. 4 is a flow diagram illustrating techniques according to an embodiment of the present invention. Step 402 includes identifying multiple stakeholders associated with capacity planning for one or more projects, wherein the capacity planning determines allocation of one or more resources at one or more locations during at least one portion of execution of the one or more projects. The resources can include one or more specific stakeholder skills. Additionally, the stakeholders can include one or more project leads, one or more managers, one or more finance personnel, one or more legal personnel, etc.

Step 404 includes determining multiple metrics to be used in connection with the capacity planning for the one or more projects. The metrics can include one or more customer satisfaction metrics, one or more service level agreement metrics, one or more profit-related metrics, one or more revenue-related metrics, one or more metrics pertaining to co-location fraction of stakeholders with one or more predetermined skills, one or more metrics pertaining to labor costs, one or more metrics pertaining to logistics costs, one or more geographic resource distribution metrics, etc.

Step 406 includes obtaining, from each of the multiple stakeholders, an initial preferred order of emphasis of the multiple metrics. Step 408 includes masking stakeholder identity for the initial preferred orders of emphasis of the multiple metrics. Step 410 includes calculating, for each of the initial preferred orders of emphasis of the multiple metrics, similarity scores between (i) the initial preferred order of emphasis and (ii) one or more of the other initial preferred orders of emphasis.

Step 412 includes outputting, to each of the multiple stakeholders, the similarity scores between (i) the initial preferred order of emphasis attributed to the stakeholder and (ii) the one or more other initial preferred orders of emphasis attributed to one or more of the other stakeholders, wherein the identity of the stakeholders has been masked. Step 414 includes obtaining, from each of the multiple stakeholders, at least a second iteration of a preferred order of emphasis of the multiple metrics.

Step 416 includes generating a final order of emphasis of the multiple metrics upon a determination that the obtained at least second iteration of preferred orders of emphasis includes at least a predetermined number of identical preferred orders of emphasis, representing the final order of emphasis. Step 418 includes outputting the final order of emphasis of the multiple metrics to at least one of (i) a user and (ii) a model for generation of a capacity planning schedule for the one or more projects.

Also, an additional embodiment of the invention includes generating a capacity planning schedule for the one or more projects based at least in part on the final order of emphasis of the multiple metrics, and outputting the capacity planning schedule to at least one user.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
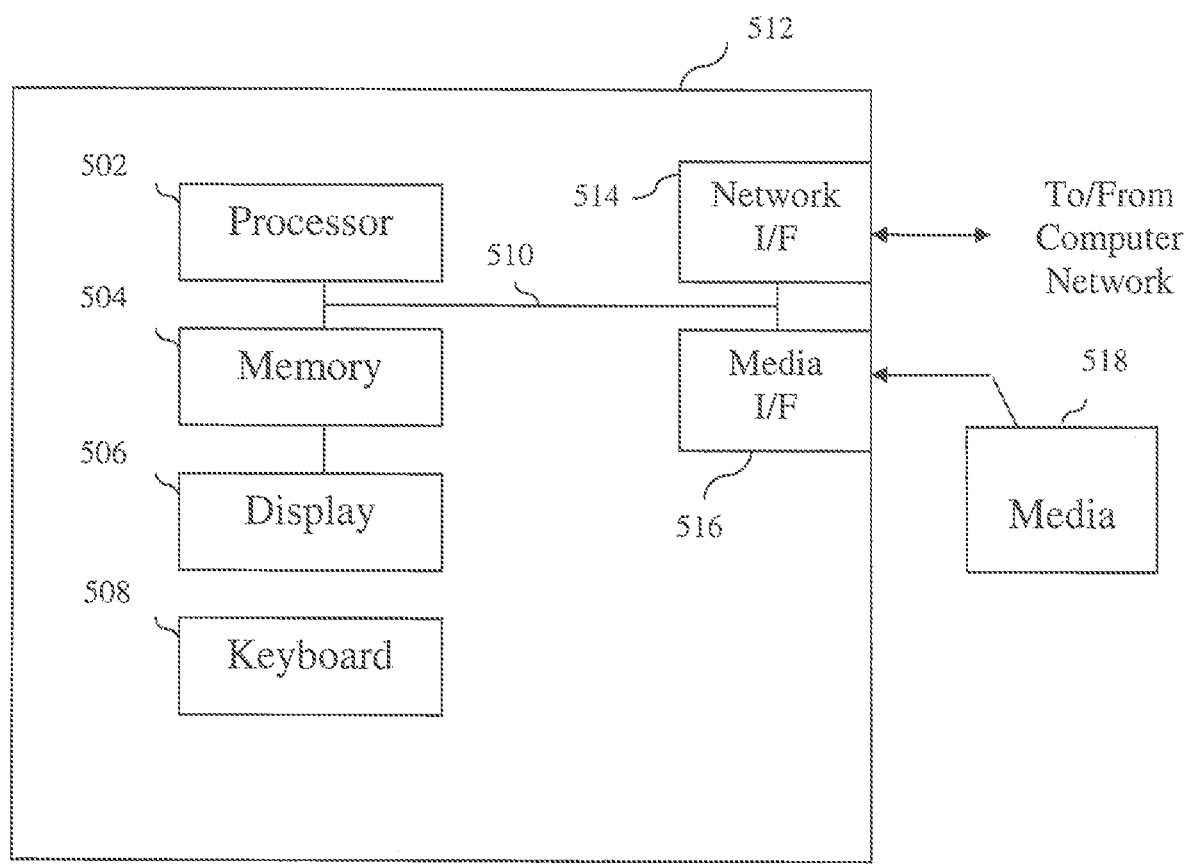
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
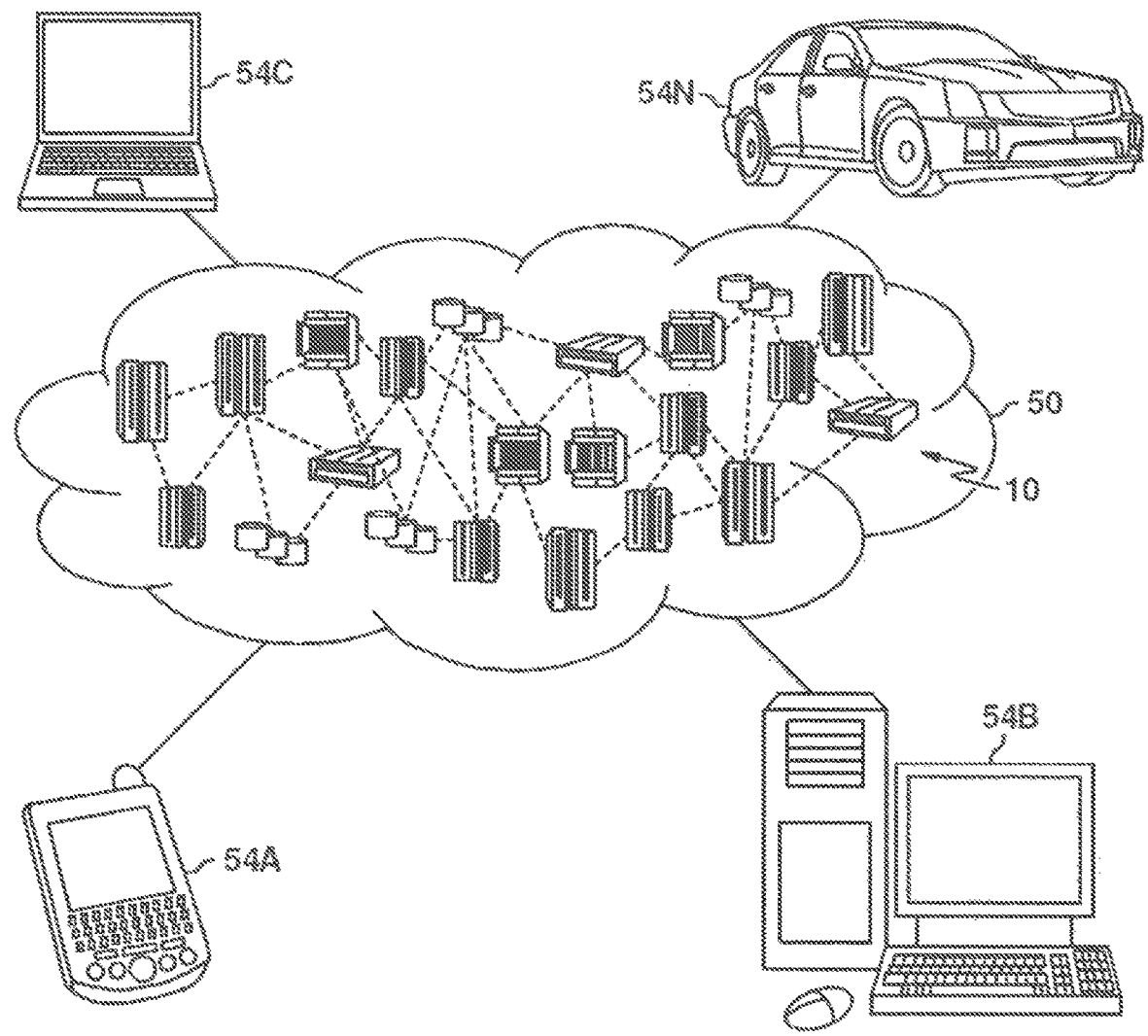
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
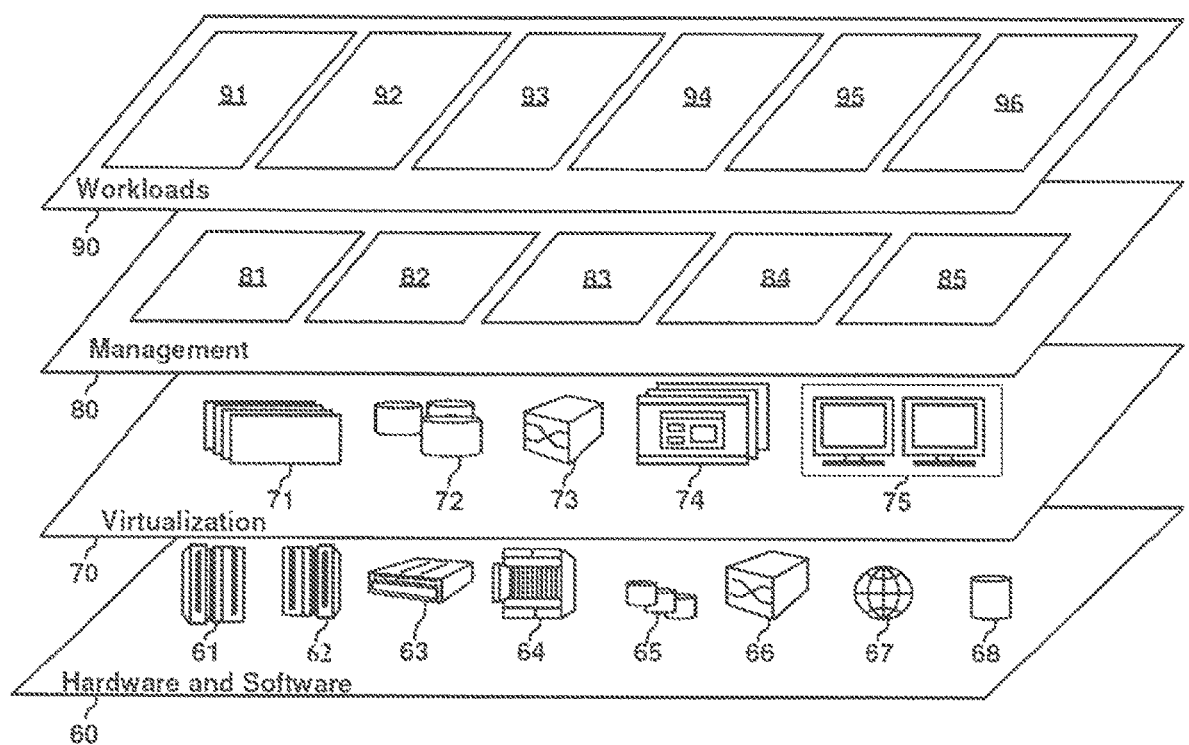
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and capacity planning scheduling 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, protecting the privacy of stakeholders' private preferences over key metrics and determining revised preference orderings for stakeholders by utilizing current private preference orderings of the key metrics and similarity scores of the current preferences with respect to other stakeholders.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining, over a network via heterogeneous thin platforms, from each of multiple stakeholders associated with capacity planning, an initial preferred order of emphasis of multiple metrics used in connection with capacity planning for one or more projects, wherein capacity planning determines allocation of one or more resources at one or more locations during at least one portion of execution of the one or more projects;
    calculating, using at least one Kendall tau distance measure, for each of the initial preferred orders of emphasis of the multiple metrics, similarity scores between (i) the initial preferred order of emphasis and (ii) one or more of the other initial preferred orders of emphasis, wherein said calculating is carried out by at least one computing device;
    outputting, over the network via the heterogeneous thin platforms, to each of the multiple stakeholders, the similarity scores between (i) the initial preferred order of emphasis attributed to the stakeholder and (ii) the one or more other initial preferred orders of emphasis attributed to one or more of the other stakeholders, wherein the identity of the stakeholders has been masked;
    obtaining, over the network via the heterogeneous thin platforms, from each of the multiple stakeholders, at least a second iteration of a preferred order of emphasis of the multiple metrics;
    masking stakeholder identity for the second iteration of preferred orders of emphasis of the multiple metrics by communicating, via at least one user interface, with at least a first of the multiple stakeholders pertaining to similarity of the at least the first stakeholder's preferred order of emphasis and the preferred order of emphasis of at least a second of the multiple stakeholders while precluding communication of identifying information of the at least the second stakeholder to the at least the first stakeholder, wherein said masking is carried out by the at least one computing device;
    generating a final order of emphasis of the multiple metrics upon a determination that the obtained at least second iteration of preferred orders of emphasis includes at least a predetermined number of identical preferred orders of emphasis, representing the final order of emphasis, wherein said generating is carried out by the at least one computing device;
    outputting, over the network via at least one thin platform, the final order of emphasis of the multiple metrics to at least one user; and
    allocating, based at least in part on the final order of emphasis of the multiple metrics, at least a portion of the one or more resources to at least a portion of the multiple stakeholders.

2. The computer-implemented method of claim 1, wherein the one or more resources comprise one or more specific stakeholder skills.

3. The computer-implemented method of claim 1, wherein the multiple metrics comprise one or more customer satisfaction metrics.

4. The computer-implemented method of claim 1, wherein the multiple metrics comprise one or more service level agreement metrics.

5. The computer-implemented method of claim 1, wherein the multiple metrics comprise one or more profit-related metrics.

6. The computer-implemented method of claim 1, wherein the multiple metrics comprise one or more revenue-related metrics.

7. The computer-implemented method of claim 1, wherein the multiple metrics comprise one or more metrics pertaining to co-location fraction of stakeholders with one or more predetermined skills.

8. The computer-implemented method of claim 1, wherein the multiple metrics comprise one or more metrics pertaining to labor costs.

9. The computer-implemented method of claim 1, wherein the multiple metrics comprise one or more metrics pertaining to logistics costs.

10. The computer-implemented method of claim 1, wherein the multiple metrics comprise one or more geographic resource distribution metrics.

11. The computer-implemented method of claim 1, wherein the multiple stakeholders comprise one or more project leads.

12. The computer-implemented method of claim 1, wherein the multiple stakeholders comprise one or more managers.

13. The computer-implemented method of claim 1, wherein the multiple stakeholders comprise one or more finance personnel.

14. The computer-implemented method of claim 1, wherein the multiple stakeholders comprise one or more legal personnel.

15. A computer program product comprising a computer readable storage medium having program instructions embodied therewith, the program instructions executable by a computing device to cause the computing device to:
    obtain, over a network via heterogeneous thin platforms, from each of multiple stakeholders associated with capacity planning, an initial preferred order of emphasis of multiple metrics used in connection with capacity planning for one or more projects, wherein capacity planning determines allocation of one or more resources at one or more locations during at least one portion of execution of the one or more projects;
    calculate, using at least one Kendall tau distance measure, for each of the initial preferred orders of emphasis of the multiple metrics, similarity scores between (i) the initial preferred order of emphasis and (ii) one or more of the other initial preferred orders of emphasis;
    output, over the network via the heterogeneous thin platforms, to each of the multiple stakeholders, the similarity scores between (i) the initial preferred order of emphasis attributed to the stakeholder and (ii) the one or more other initial preferred orders of emphasis attributed to one or more of the other stakeholders, wherein the identity of the stakeholders has been masked;

obtain, over the network via the heterogeneous thin platforms, from each of the multiple stakeholders, at least a second iteration of a preferred order of emphasis of the multiple metrics;

mask stakeholder identity for the second iteration of preferred orders of emphasis of the multiple metrics by communicating, via at least one user interface, with at least a first of the multiple stakeholders pertaining to similarity of the at least the first stakeholder's preferred order of emphasis and the preferred order of emphasis of at least a second of the multiple stakeholders while precluding communication of identifying information of the at least the second stakeholder to the at least the first stakeholder;

generate a final order of emphasis of the multiple metrics upon a determination that the obtained at least second iteration of preferred orders of emphasis includes at least a predetermined number of identical preferred orders of emphasis, representing the final order of emphasis;

output, over the network via at least one thin platform, the final order of emphasis of the multiple metrics to at least one user; and allocate, based at least in part on the final order of emphasis of the multiple metrics, at least a portion of the one or more resources to at least a portion of the multiple stakeholders.

16. The computer program product of claim 15, wherein the one or more resources comprise one or more specific stakeholder skills.

17. A system comprising:
a memory; and
at least one processor operably coupled to the memory and configured for:
obtaining, over a network via heterogeneous thin platforms, from each of multiple stakeholders associated with capacity planning, an initial preferred order of emphasis of multiple metrics used in connection with capacity planning for one or more projects, wherein capacity planning determines allocation of one or more resources at one or more locations during at least one portion of execution of the one or more projects;

calculating, using at least one Kendall tau distance measure, for each of the initial preferred orders of emphasis of the multiple metrics, similarity scores between (i) the initial preferred order of emphasis and (ii) one or more of the other initial preferred orders of emphasis;

outputting, over the network via the heterogeneous thin platforms, to each of the multiple stakeholders, the similarity scores between (i) the initial preferred order of emphasis attributed to the stakeholder and (ii) the one or more other initial preferred orders of emphasis attributed to one or more of the other stakeholders, wherein the identity of the stakeholders has been masked;

obtaining, over the network via the heterogeneous thin platforms, from each of the multiple stakeholders, at least a second iteration of a preferred order of emphasis of the multiple metrics;

masking stakeholder identity for the second iteration of preferred orders of emphasis of the multiple metrics by communicating, via at least one user interface, with at least a first of the multiple stakeholders pertaining to similarity of the at least the first stakeholder's preferred order of emphasis and the preferred order of emphasis of at least a second of the multiple stakeholders while precluding communication of identifying information of the at least the second stakeholder to the at least the first stakeholder;

generating a final order of emphasis of the multiple metrics upon a determination that the obtained at least second iteration of preferred orders of emphasis includes at least a predetermined number of identical preferred orders of emphasis, representing the final order of emphasis;

outputting, over the network via at least one thin platform, the final order of emphasis of the multiple metrics to at least one use; and allocating, based at least in part on the final order of emphasis of the multiple metrics, at least a portion of the one or more resources to at least a portion of the multiple stakeholders.

18. The system of claim 17, wherein the one or more resources comprise one or more specific stakeholder skills.

* * * * *